Aug. 24, 1965

T. A. INSOLIO 3,202,302

VACUUM TRANSFER CONVEYOR

Filed June 20, 1962

INVENTOR.
Thomas A. Insolio

BY Webb, Mackey & Burden

HIS ATTORNEYS

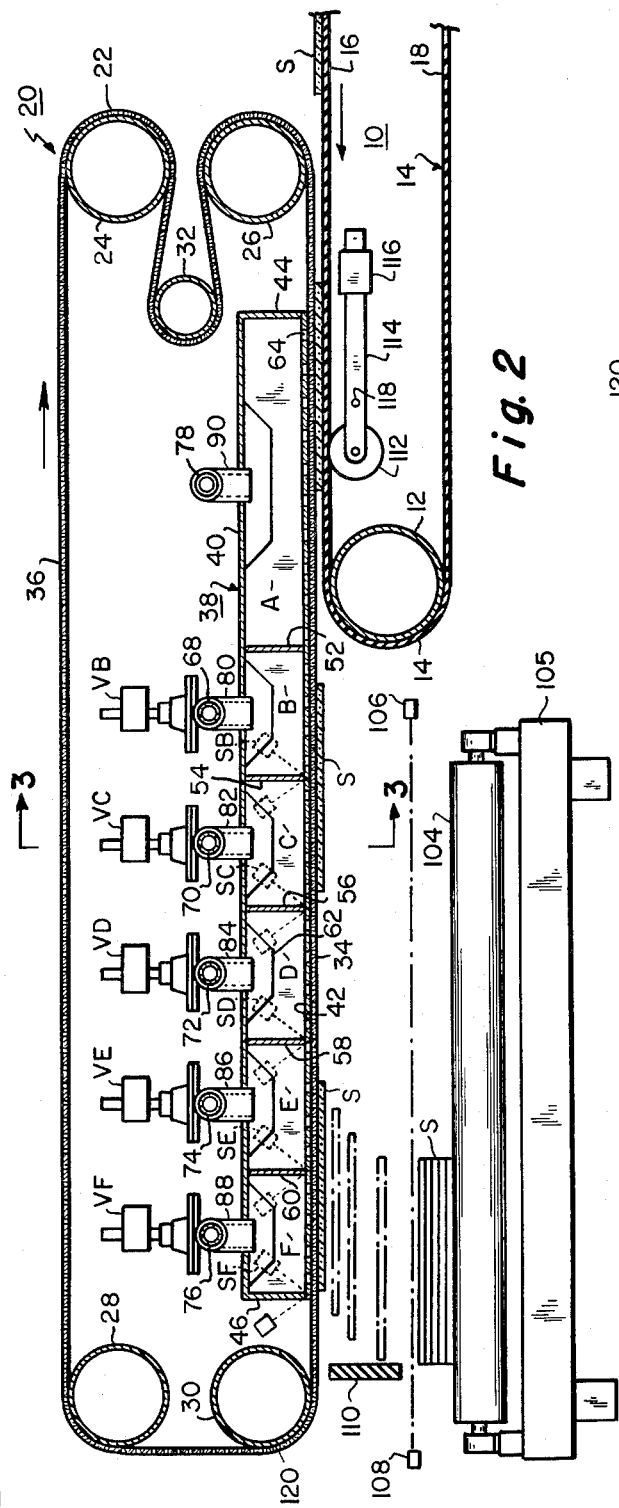
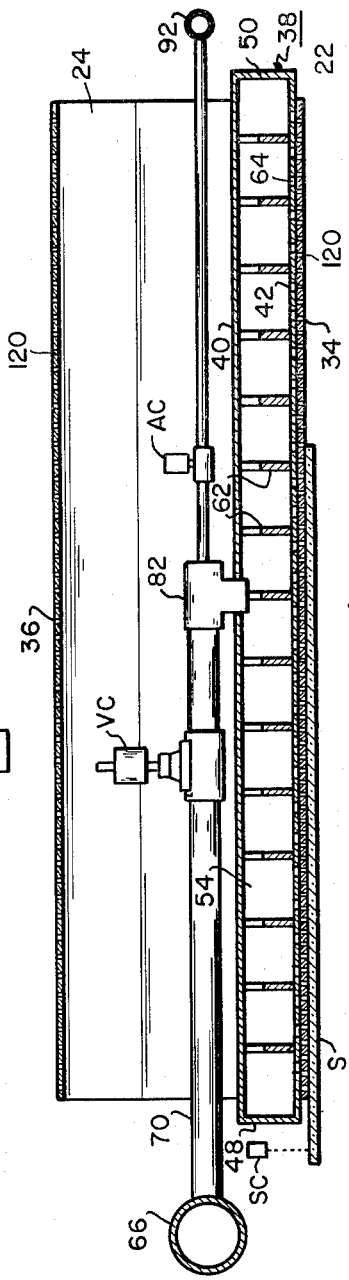
Fig. 2
Fig. 3
INVENTOR.
Thomas A. Insolio
BY Webb, Mackey & Burden
HIS ATTORNEYS Aug. 24, 1965   T. A. INSOLIO   3,202,302
VACUUM TRANSFER CONVEYOR
Filed June 20, 1962   5 Sheets-Sheet 3
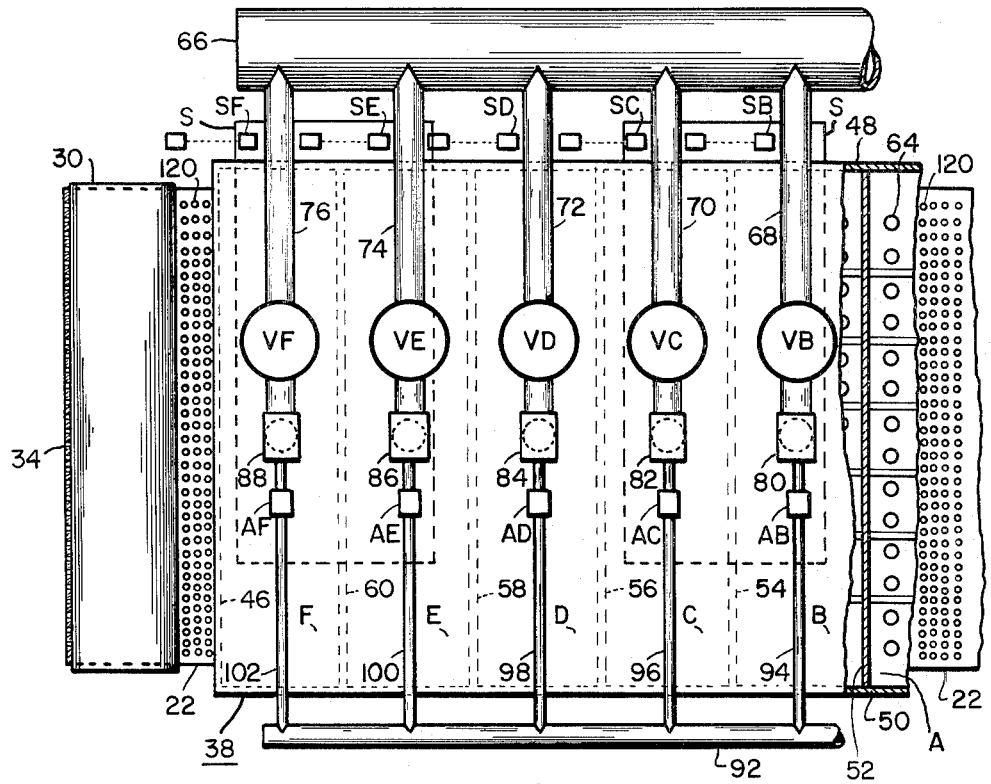
Fig. 4
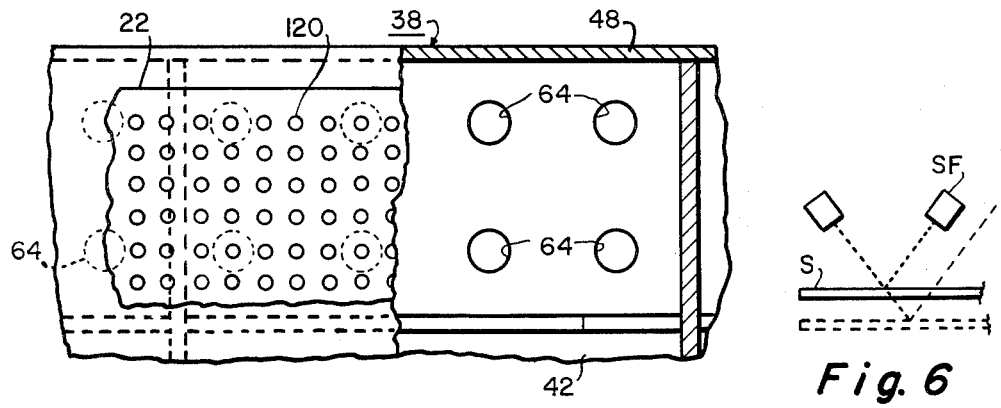
Fig. 5
Fig. 6
INVENTOR.
Thomas A. Insolio
BY Webb, Mackey & Burden
HIS ATTORNEYS

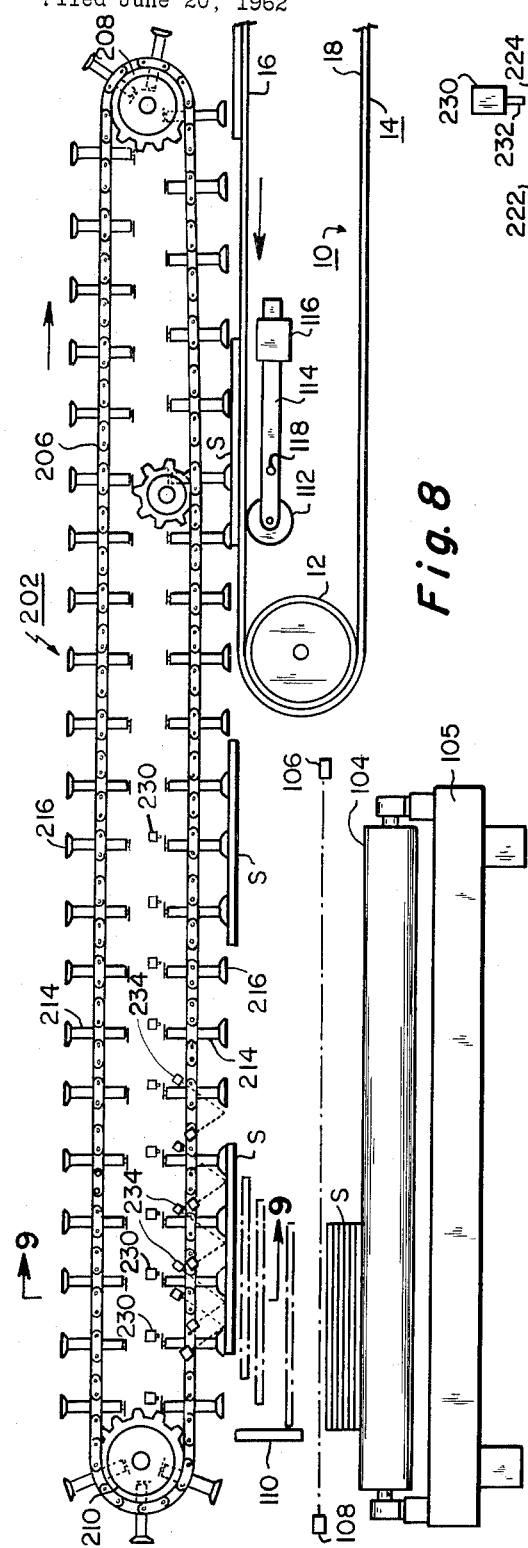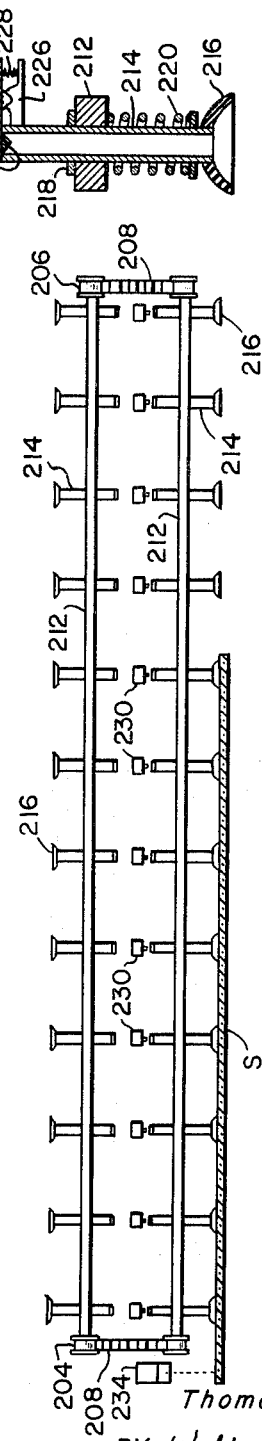

United States Patent Office 3,202,302
Patented Aug. 24, 1965

3,202,302
VACUUM TRANSFER CONVEYOR
Thomas A. Insolio, Jeannette, Pa., assignor to American-Saint Gobain Corporation, Kingsport, Tenn., a corporation of Delaware
Filed June 20, 1962, Ser. No. 203,771
2 Claims. (Cl. 214—1)

This invention relates to a vacuum transfer conveyor and more particularly to a vacuum transfer conveyor that is arranged to transfer sheets of glass from one conveyor to a stacking device.

The removal of sheet material from a fast moving conventional endless belt conveyor has in the past been accomplished by personnel removing the sheets manually and stacking the sheets adjacent the conveyor. This so-called "hand pick-off" of sheet material, especially sheets of glass, has definite limitations. In fact machine speed at which sheets of glass can be efficiently removed from an endless feed conveyor is about 65 feet per minute. There is, therefore, a need for a mechanical means to transfer glass sheets from a main feed conveyor and stack the same. This is especially true where the primary line from the cutting machine is traveling at a speed greater than 65 feet per minute. The removal of the sheets of glass from the main conveyor and the stacking of the glass sheets, therefore, present a severe limitation in the speed at which glass sheets can be processed.

Another substantial problem that is encountered with any mechanical means employed to transfer the glass sheets from the conveyor to the stacker is the differing sizes of the glass sheets. It has been proposed to employ oscillating arms with vacuum heads to remove the sheets from the main conveyor and to stack the sheets adjacent the main conveyor. The oscillating arm type of transfer means is not practical because, as above discussed, the speed at which it is desired to move the glass sheets is excessive for an oscillating arm type transfer device and the frequency and wide range of sizes of the glass sheets renders the oscillating arm type transfer device impractical. I have discovered by using an endless perforated belt conveyor in combination with a vacuum means and a positive air pressure means that it is possible to remove the sheets of glass from the main conveyor and stack the same on a stacker spaced from the main conveyor. The perforated belt conveyor travels at substantially the same speed as the main conveyor and eliminates the problems encountered with high speed conveyors. I have also provided a sensing device which senses the size of the sheets of glass and positively discharges the sheets of glass from the vacuum conveyor onto a stacking device at a desired predetermined position. The stacking device can include another transverse conveyor which conveys predetermined stacks of glass sheets away from the glass stacker.

Briefly, my vacuum transfer conveyor can be considered an inverted conveyor since the sheets of glass are held to the under side of the perforated belt by means of a vacuum. The lower run of the perforated belt is in contact with the perforated bottom plate of a vacuum chamber. The chamber is divided into a number of isolated transverse compartments. Vacuum is drawn into each compartment through separate vacuum connections. Control means are provided in certain of the compartments to stop the vacuum and to admit air under pressure into the preselected compartments. Air under pressure positively disengages the glass sheet from the under side of the perforated belt and discharges the sheet onto a glass stacker. The endless perforated transfer conveyor belt is so positioned that a portion of the belt lies above an end portion of the main conveyor belt. The sheets of glass conveyed onto the main conveyor belt pass under the perforated transfer conveyor belt. A pressure means below the main conveyor belt urges the glass sheet against the under side of the endless perforated transfer conveyor belt. The vacuum from the vacuum chambers picks up the glass sheet from the main conveyor belt and conveys it to a stacking device where the glass sheets are discharged from the vacuum conveyor and stacked in piles. In this manner it is now possible to speedily transfer sheets of glass from a main conveyor to a stacking table.

The method and apparatus which comprise this invention accomplish the foregoing and other functions in a novel way as will now be explained. Further features, objects and advantages will either be specifically pointed out or become apparent when, for a better understanding of the invention, reference is made to the following written description, taken in conjunction with the accompanying drawings which form a part hereof, and in which:

FIGURE 2 is a view in side elevation and in section taken along the line 2—2 in FIGURE 1.

FIGURE 3 is a view in front elevation taken along the line 3—3 in FIGURE 2.

FIGURE 4 is a view in top plan illustrating the sheet scanners and their relative position to the various compartments.

FIGURE 5 is an enlarged view in plan of the under side of a portion of the perforated belt and the chamber bottom plate.

FIGURE 6 is a diagrammatic showing of the manner in which the photoelectric scanners sense the presence of a sheet of glass.

FIGURE 8 is a view in side elevation of another embodiment of my invention wherein a plurality of vacuum cups serve as the vacuum means to convey the sheets of glass from a main conveyor to a stacking device.

FIGURE 9 is a view in section and front elevation taken along the line 9—9 of FIGURE 8.

FIGURE 10 is a detail view of the actuating mechanism for the vacuum cups to release vacuum contact between the cup and the sheet of glass.

Figure 1:
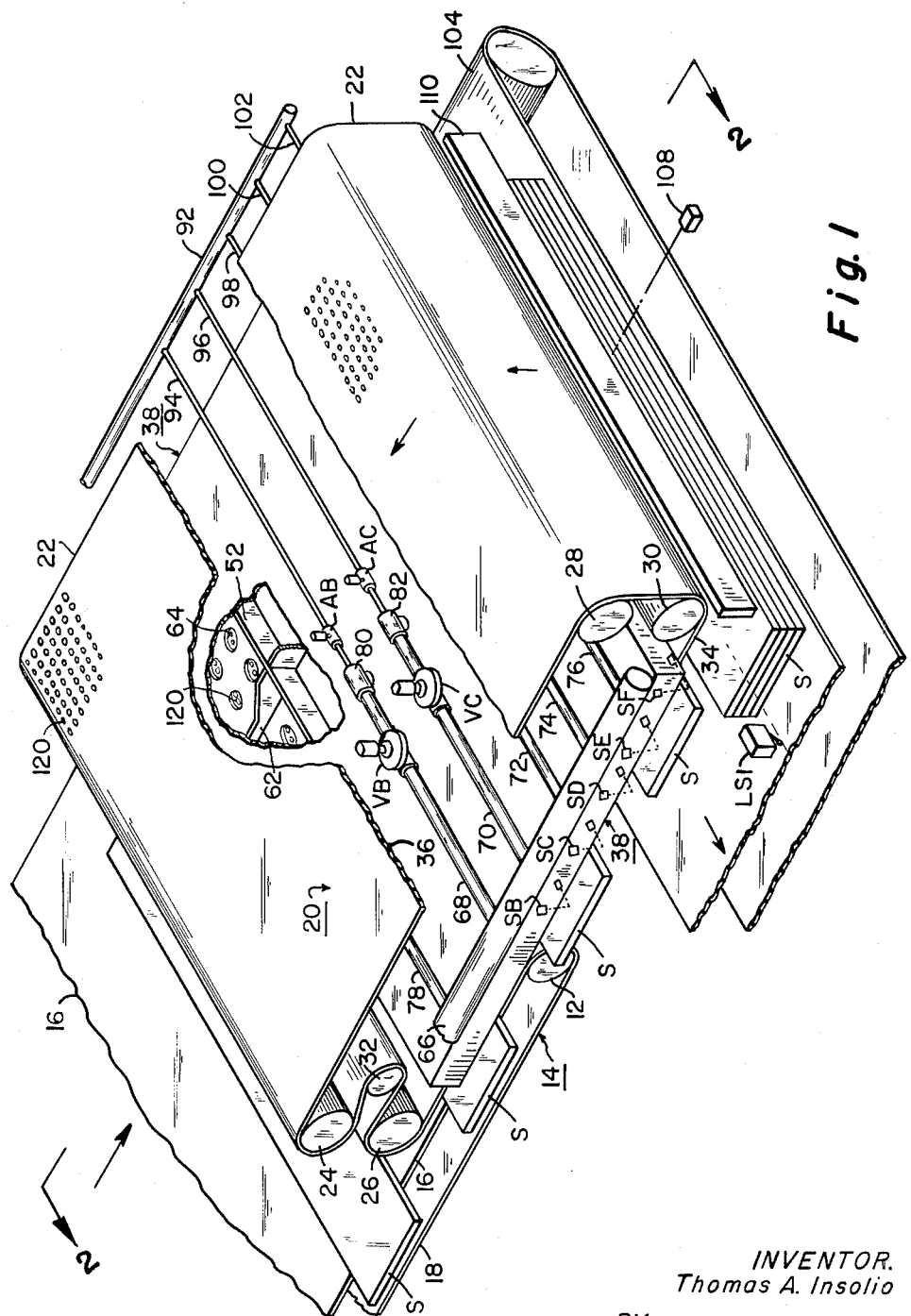
FIGURE 1 is a perspective view of the transfer conveyor with portions of the endless perforated belt broken away to illustrate the apertures in the bottom plate of the chamber and the various transverse compartments.

Referring to the drawings, and particularly FIGURES 1, 2 and 3, there is illustrated a portion of a main conveyor 10 with a head pulley 12 around which flexible endless conveyor belt 14 extends. The conveyor belt 14 moves in the direction indicated by the direction arrow in FIGURES 1 and 2. The endless conveyor 10 has an upper conveying reach 16 and a lower return reach 18. The main conveyor 10 may form a portion of the primary line of a glass processing system. My vacuum transfer conveyor generally designated by the numeral 20 includes an endless perforated or porous belt 22 which is threaded around turnaround pulleys 24, 26, 28 and 30. A take-up pulley 32 is positioned between the turnaround pulleys 24, 26 to maintain the endless belt 22 under proper tension. The turnaround pulleys are arranged so that there is a substantial space between the lower run 34 of the endless perforated belt 22 and the upper run 36 in order that a chamber generally designated by the numeral 38 may be positioned therebetween. The chamber 38 has a generally rectangular configuration with a top wall 40, bottom wall 42, end walls 44 and 46, and side walls 48 and 50 (see FIGURES 2 and 3). The chamber 38 has a plurality of transverse walls 52, 54, 56, 58 and 60 extending between the upper wall 40 and lower wall 42 forming a plurality of compartments A, B, C, D, E and F within chamber 38. The chambers B through F have rib members 62 which are arranged to strengthen the various compartments but are provided with cut-away portions so that either vacuum or air pressure is evenly distributed throughout the respective compartments.

A portion of the chamber bottom wall 42 is illustrated in detail in FIGURE 5. The bottom wall 42 has a plurality of circular apertures 64 which may preferably have a dimension of about 5/16 inch. The apertures 64 are arranged on one inch centers and are arranged so that they are within the respective compartments and do not overlap between compartments B through F. The chamber bottom wall 42 has apertures 64 extending both throughout its length and throughout its width. The apertures 64 are employed as air inlet means when a vacuum is applied to the various compartments. Other than the apertures 64 in the bottom of the chamber 38, the remainder of the chamber is constructed in an airtight manner. The walls 52 through 60 also insulate the respective compartments from each other so that each compartment B through E may be independently controlled. Positioned above the chamber 38 and adjacent the wall 48 there is a vacuum manifold 66 which is connected to a suitable source of vacuum such as a vacuum pump or the like. Extending laterally from the vacuum manifold 66 are a plurality of vacuum conduits 68, 70, 72, 74, 76 and 78 which extend above the respective chambers B, C, D, E, F and A. Each of the chambers B, C, D, E and F have a T connector 80, 82, 84, 86 and 88 respectively, secured in the upper wall 40 of chamber 38 within each compartment. One portion of the respective T connection is connected to vacuum conduits 68 through 76 respectively. Conduit 78 is connected by an L connection 90 to compartment A. Positioned on the opposite side of the chamber 38 there is an air pressure manifold 92 which has laterally extending conduits 94, 96, 98, 100 and 102 which are connected to the other opening of T connections 80 through 88 respectively. In vacuum conduits 68 through 76 there are positioned vacuum solenoid valves VB, VC, VD, VE and VF which are arranged to control the vacuum created in respective chambers B through F. In conduits 94 through 102 there are positioned solenoid air valves AB, AC, AD, AE and AF which are arranged to control the passage of air under pressure through the respective air conduits into the respective chambers. It should be noted that chamber A does not include a control valve and does not have a source of air under pressure.

Positioned along side 48 of chamber 38 there are a plurality of sensing devices which are arranged to sense the presence of a sheet of glass. A suitable sensor is a photoelectric scanner such as a source of light positioned at a given angle so that its reflection from a sheet of glass will be sensed by a light sensitive device such as a photoelectric cell. Each compartment has a sensor and they are designated SB, SC, SD, SE and SF respectively. The sensors are arranged to sense the presence of a sheet of glass and to close switches in a circuit, later described, and actuate various controls.

FIGURE 6 illustrates how the source of light is reflected from a sheet of glass and how the ray of light is picked up by the light sensitive element. As the glass sheet moves downwardly from the plane illustrated in solid lines in FIGURE 6 to the plane illustrated in dotted lines, the angle at which the light is reflected from the sheet of glass is such that it no longer is received by the photo sensitive element.

Positioned transversely of the vacuum transfer conveyor 20 adjacent the turnaround rollers 28 and 30 is a vertically moving endless stack transfer conveyor 104. The stack transfer conveyor 104 is supported on a table 105 which is movable vertically relative to transfer conveyor 20. The conveyor 104 is arranged to move in a direction transverse to the direction of movement of the vacuum transfer conveyor 20 at a preselected signal. The table 105 moves vertically by means of well known power screw jack legs which are actuated by a suitable source of power, as later described. A photoelectric cell 106 is positioned above the movable stacker conveyor 104 and a source of light 108 is positioned on the other side of the stacker conveyor 104. The glass sheets, as later described, actuate the photo cell to lower the conveyor 104 so that the elevation or level of the top of the stack is always just below the level of the light beam. An electric counter is associated with the circuit to actuate the stacker conveyor 104 when a predetermined number of glass sheets are in a given stack below the vacuum transfer conveyor. A rubber stop 110 is positioned adjacent the turnaround roller 30 and the glass sheets are arranged to strike the rubber stop as they are discharged from the vacuum conveyor 20 so that the glass sheets can fall into proper position on the stack.

The lower run 34 of vacuum transfer conveyor belt 20 is positioned above the main conveyor 10 with a portion of the lower run 34 being in overlying relation with a portion of the main conveyor conveying reach 16. The space between the conveyor belts 14 and 22 is slightly greater than the thickness of a sheet of glass. A roll 112 is positioned beneath the conveying reach 16 of main conveyor 10 and has an arm 114 extending rearwardly therefrom with a weight 116 secured thereto. The arm is pivoted at 118 to urge the conveying reach 16 of main conveyor 10 upwardly against the under side of lower run 34. The sheets of glass are conveyed from the primary line by main conveyor 10 in predetermined spaced relation to each other. As the sheet passes under compartment A of chamber 38, the roll 112 urges the glass sheet upwardly against the under side of the lower run 34 of the perforated conveyor belt 22. The vacuum means is actuated and compartment A has a vacuum which holds the glass sheet against the under side of the lower run 34 of belt 22. Chambers B, C, D, E and F also are under a vacuum so that as the conveyor belt progresses from compartment A toward compartment F the glass sheet remains secured to the under side of belt 22. The glass sheets are so positioned on the main conveyor that an edge of the sheet extends beyond the compartment side wall 48 and beyond the edge of the conveyor belt 22. In this manner the sensing devices SB through SF are arranged to sense the presence of a glass sheet. As the sheet and conveyor belt 22 progress toward end wall 46 of chamber 38, the sensing devices are actuated, depending on the size of the glass sheet, to close the respective vacuum valves and open the respective air valves in the chambers above the glass sheet. Thus, if a glass sheet extends across chambers E and F, the sensing devices SF and SE close vacuum valves VF and VE and actuate air valve AF–AE to provide a positive pressure on the under side of perforated belt 22 to positively disengage the glass sheet from the under side of the belt 22. The glass sheet after it is discharged from conveyor belt 22 strikes the heavy rubber stop 110 and drops onto a stack on stacking conveyor 104. When a predetermined number of sheets as indicated by the counter hereinafter described are arranged in a stack, the transfer conveyor 104 moves transversely of the vacuum conveyor 20 and the table is again moved vertically upward to properly position the stack transfer conveyor 104 for another stack of glass sheets.

In order that the glass sheets may adhere to the under side of belt 22, the belt may be fabricated of a porous material with the edges of the belt suitably sealed so that the vacuum impressed on one side of the belt will hold a sheet of glass on the under side of the belt. The belt 22 may also have perforations 120 therein which are preferably spaced on 1/4 inch centers and have a diameter of 3/32 inch (see FIGURE 5). With this arrangement of the perforations 120 in the belt and the apertures 64 in the bottom plate, a positive vacuum will be exerted on the glass sheets by each of the compartments. It should be understood that the vacuum transfer belt 22 is capable of holding a sheet of glass with an overlying sheet of paper positioned thereon so that sheets of paper may be interleaved between the sheets of glass as they are stacked on the stacking conveyor 104.

Figure 7:
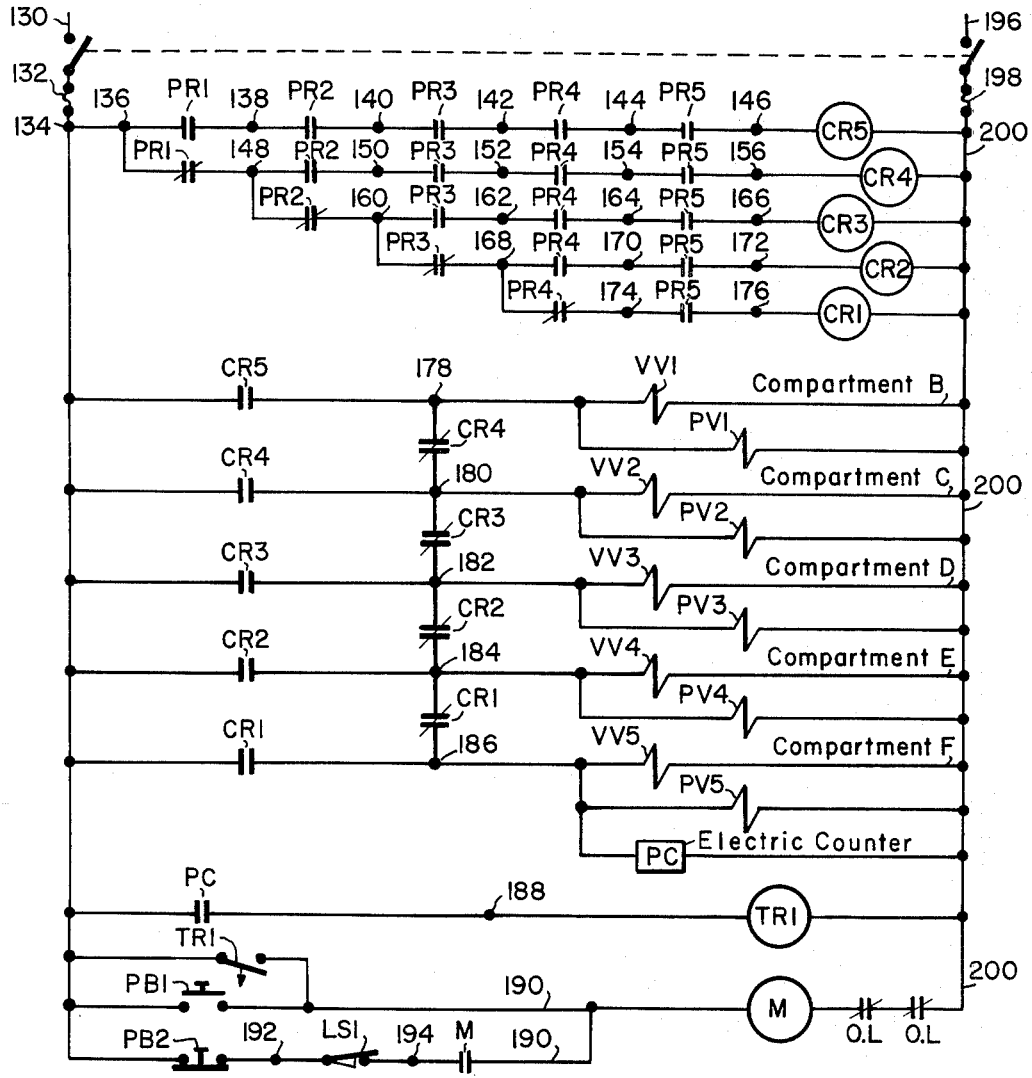
FIGURE 7 is a schematic electrical control diagram for the vacuum transfer conveyor.
Figure 7:
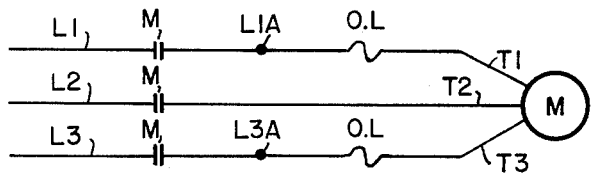

Referring to the circuit diagram illustrated in FIGURE 7, there is shown schematic circuits 130 through 200 which include various control relays, solenoids for the vacuum valves and air valves in the various compartments, switches actuated by the photo sensing devices SB through SF and switches actuated by the respective control relays. The circuit operates as follows.

The leading edge of the glass sheet, through sensor SF, will always actuate and close normally open switch PR5 in circuits 144–146, 154–156, 164–166, 170–172, and 174–176. Switch PR4 in circuit 168–174 is normally closed, as is switch PR3 in circuit 160–168 and switch PR2 in circuit 148–160 and switch PR1 in circuit 136–148. Thus, if the glass sheet is of such a length that it reaches the end wall 46 of compartment 38 and only closes switch PR5, control relay CR1 in circuit 176–200 will be energized. Control relay CR1 closes normally open switch CR1 in circuit 134–186 and opens normally closed switch CR1 in circuit 184–186. Thus, solenoid VV5 is actuated to close vacuum valve VF and solenoid PV5 is simultaneously actuated to open air valve AF. In this manner the vacuum conduit 76 in compartment F is shut off and air under pressure is admitted through conduit 102 to positively release the sheet of glass from the under side of conveyor belt 22. An electric counter PC is included in circuit 186–200 and counts the number of times that normally open switch CR1 is opened and closed, thereby indicating the number of glass sheets in a given stack. It should be noted that if the sheet of glass is only as long as compartment F, vacuum remains in compartments A through E so that other sheets remain in proper conveying position beneath the under side of perforated belt 22.

Assume a glass sheet is three compartments long, that is, it has a total length equivalent to the length of compartments F, E and D. The sensors SF, SE and SD will close all normally open switches PR3, PR4 and PR5 and open all normally closed switches PR3 and PR4. Because of the arrangement of the switches in the circuit only control relay CR3 is energized. The relay CR3 then closes normally open switch CR3 in circuit 134–182 and opens normally closed switch CR3 in circuit 180–182. In this manner solenoids VV3 in compartment D, VV4 in compartment E and VV5 in compartment F are energized to close vacuum valves VD, VE and VF. Solenoids PV3, PV4 and PV5 are also energized to open air valves AD, AE and AF. As the sheet drops, the contacts of switch PR3, PR4, and PR5 instantly open to thereby close the respective air valves and open the respective vacuum valves. Each time circuit 186–200 is energized, a pulse is counted by counter PC in circuit 186–200. When a preset count is reached, normally open switch PC in circuit 134–188 closes and the counter zeros. The timer TR1 in circuit 188–200 is energized by the closing of switch PC in circuit 134–188. Contacts TR1 in circuit 134–190 are closed by the timer TR1 and remain closed for a sufficient length of time for starting coil M in circuit 190–200 to energize. The timed contact for the starter coil M is required because the switch PC in circuit 134–188 closes and opens immediately. Thus, the motor energized by the starter coil M in circuit 190–200 is only energized after a predetermined number of sheets are stacked. The starter coil M closes normally open switches M in the separate motor circuit illustrated to start the stack conveyor motor. The stack of glass trips a limit switch LS1 in circuit 192–194 to stop the conveyor.

The lower run 34 of transfer conveyor belt 22 and the upper conveying reach 16 of main conveyor belt 14 travel in the same direction and at substantially the same speed. The driving means for the conveyors has not been illustrated, but it should be understood that a conventional synchronized driving means may be employed to propel belts 14 and 22 at the same speed. It is preferable that the sheets of glass be spaced on the main conveyor conveying reach 16 at a distance of about one and one-half compartments. In compartment A there is no valve to control the vacuum. Air under pressure is not supplied to compartment A since this compartment is considered the pick-off compartment and does not utilize positive air pressure to release glass sheets therefrom.

In FIGURES 8, 9 and 10 another embodiment of my invention is illustrated and similar numerals for previously described portions of the apparatus will be employed. The vacuum transfer conveyor generally designated by the numeral 202 illustrated in FIGURES 8, 9 and 10 includes a pair of endless chains 204 and 206 which each extend around a pair of sprockets 208 and 210. The chains 204 and 206 have spaced conveyor flights 212 connected thereto to form a chain type conveyor. Secured to and depending from the conveyor flights 212 are a plurality of tubular members 214 each of which has a conventional rubber vacuum cup 216 secured at one end. The tubular members 214 are slidably positioned in the transverse flights 212 and have an abutment means 218 limiting outward movement of the tubular members. A coil spring 220 urges the abutment means 218 against the transverse conveyor flights 212. With this arrangement it is possible to move the vacuum cup and tubular member 214 upwardly relative to transverse flight 212 against the opposing force of spring 220. A valve 222 closes the upper end of tube 214. The lower end of tube 214 opens into the inner portion of vacuum cup 216. Thus, with valve 222 closed, in urging a sheet of material against vacuum cup 216, the sheet will adhere to the vacuum cup 216. When valve 222 is opened the vacuum holding the sheet to the cup 216 is released so that the sheet is no longer held against the respective vacuum cup. The valve 212 has an arm 224 extending laterally therefrom which is pivotally connected to a member 226 which extends laterally from tubular member 214. A spring 228 urges the valve 222 into a closed position. An actuating means 230 having an arm 232 is arranged upon actuation to move lever 224 and thereby open valve 222.

In FIGURE 8 the main conveyor 10 is illustrated as having the conveying reach 16 positioned beneath the endless transfer conveyor 202. The roll 112 urges the conveying reach upwardly against the open side of the vacuum cups 216. The sprockets 208 are so positioned that the transfer conveyor 202 slopes slightly upwardly so that the vacuum cups do not contact the glass sheet as they are first positioned above the glass sheet. The roll 112 positively urges the conveying reach 16 of main conveyor 10 upwardly so that the glass sheets are moved into contact with the vacuum cups 216 and are held by the vacuum cups 216.

At the discharge end of vacuum conveyor 202 there are sensing devices 234 spaced at predetermined intervals which are arranged to actuate a plurality of actuating devices 230 which open the respective valves 222 and release the vacuum cups 216 to release the sheet of glass. At the discharge portion of the vacuum conveyor 202 there is a transverse stacker conveyor 104 and a vertically moving table 105 which may be controlled in a similar manner as the previously discussed embodiment illustrated in FIGURES 1 through 7.

Main conveyor belt 14 and transfer conveyor 202 travel in the same direction at substantially the same speed in a manner similar to that of embodiment one.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:

1. A transfer conveyor comprising an endless perforated belt threaded around a pair of spaced turnaround pulleys and having a lower run and an upper run, a vacuum chamber positioned between said upper run and said lower run, said vacuum chamber having a planar bottom wall in abutting relation with a surface of the lower run of said belt, said bottom wall having a plurality of spaced apertures therein substantially larger than said perforations in said belt, said chamber having a plurality of lateral walls forming a plurality of separate lateral compartments, vacuum means for each of said compartments, control means for each of said compartments, means to urge different sized articles into abutting relation with the under side of said belt lower run at a first location wherein said article is held against the surface of said belt by the vacuum in said chamber, and a plurality of spaced sensors positioned at one side of said belt at a second location, said sensors arranged to provide a signal as said article is conveyed to said second location, and means connecting said sensors to said control means, said last named means operable to actuate a sufficient number of said control means at said second location to deenergize said vacuum means in certain of said compartments to thereby release said article from said belt at said second location.

2. A transfer conveyor arranged to transfer a substantially impermeable sheet-like article from the upper conveying run of a main endless conveyor belt to a stacking device comprising a pair of spaced turnaround pulleys, an endless perforated belt threaded around said turnaround pulleys and forming an upper return run and a lower conveying run, a portion of said perforated belt positioned in overlying relation with a portion of said main endless conveyor belt, an elongated rectangular chamber positioned between said upper run and said lower run, said chamber having a plurality of compartments, said chamber bottom wall having a plurality of spaced apertures of a size substantially lrager than said perforations in said belt, said chamber positioned with said bottom wall in communication with the upper surface of said perforated belt lower conveying run, air exhaust means to provide a vacuum in said chamber, air pressure means, conduit means connecting said air exhaust means to all of said compartments, other conduit means connecting said air pressure means to certain of said compartments, vacuum valve means in said first conduit means to control said air exhaust from said respective compartments, pressure valve means in said second conduit means to control the flow of pressurized air to said certain compartments, drive means to circulate said main conveyor belt and said endless perforated belt at substantially the same speed with said perforated belt lower run moving in the same direction as said main conveyor belt upper conveying run, means to urge a portion of said main conveyor belt upper conveying run against a portion of said perforated conveyor belt lower conveying run so that said sheet-like article being conveyed on said main conveyor upper conveying run is urged against the under side of said perforated belt and held against said perforated belt by said vacuum in said chamber, a plurality of sensors positioned on one side of said perforated belt adjacent said stacking device, said sensors arranged to close said vacuum valve means and open said pressure valve means in said compartment, and support means to interlock said sensors so that said valve means are not actuated until said article has been conveyed to a predetermined position above said stacking device and to substantially simultaneously close said vacuum valve means and open said pressure valve means in all of said compartments above said article to thereby release said article from said perforated belt and deposit said article on said stacking device.

References Cited by the Examiner

UNITED STATES PATENTS 2,732,957   1/56   Horner.
2,772,880   12/56  Garrett _____ 271—74
2,789,704   4/57   Lewin.
2,813,637   11/57  Perry et al.

FOREIGN PATENTS 1,246,585   10/60   France.

HUGO O. SCHULZ, *Primary Examiner.*

MORRIS TEMIN, *Examiner.*